United States Patent
Thubert et al.

(10) Patent No.: US 11,283,831 B2
(45) Date of Patent: *Mar. 22, 2022

(54) DYNAMIC DEVICE ISOLATION IN A NETWORK

(71) Applicant: Cisco Technology, Inc., San Jose, CA (US)

(72) Inventors: Pascal Thubert, La Colle sur Loup (FR); Eric Levy-Abegnoli, Valbonne (FR); Eliot Lear, Wetzikon (CH); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,858

(22) Filed: May 24, 2019

(65) Prior Publication Data
US 2019/0281085 A1 Sep. 12, 2019

Related U.S. Application Data

(63) Continuation of application No. 15/446,707, filed on Mar. 1, 2017, now Pat. No. 10,356,124.

(51) Int. Cl.
*H04L 29/06* (2006.01)
*H04L 29/12* (2006.01)
(Continued)

(52) U.S. Cl.
CPC ...... *H04L 63/1458* (2013.01); *H04L 61/1511* (2013.01); *H04L 63/10* (2013.01);
(Continued)

(58) Field of Classification Search
CPC . H04L 63/1425; H04L 63/145; H04L 9/3263; H04L 63/166; H04L 63/0823;
(Continued)

(56) References Cited

U.S. PATENT DOCUMENTS 8,504,543 B1 8/2013 Andreessen ............ H04L 67/02 707/705
9,622,143 B1 * 4/2017 Sankaran ............ H04L 12/4604
(Continued)

OTHER PUBLICATIONS

Data Formats for In-band OAM draft-brockners-inband-oam-data-00;"F. Brockners, S. Bhandari, C. Pignataro, Cisco, H. Gredler.", Jul. 8, 2016; pp. 1-21.*
(Continued)

*Primary Examiner* — Mohammad A Siddiqi
(74) *Attorney, Agent, or Firm* — Behmke Innovation Group LLC; James M. Behmke; Jonathon P. Western

(57) ABSTRACT

In one embodiment, a device in a network inserts a profile tag into an address request sent by an endpoint node in the network to a lookup service. The lookup service is configured to identify one or more addresses with which the endpoint node is authorized to communicate based on a profile for the endpoint node associated with the inserted profile tag. The device receives an address response sent from the lookup service to the endpoint node that indicates the set of one or more addresses with which the endpoint node is authorized to communicate. The device determines whether a communication between the endpoint node and a particular network address is authorized using the set of one or more addresses with which the endpoint node is authorized to communicate. The device blocks the communication based on a determination that the particular network address is not in the set of one or more addresses with which the endpoint node is authorized to communicate.

16 Claims, 9 Drawing Sheets

(51) Int. Cl.
*H04L 61/4511* (2022.01)
*H04L 61/5014* (2022.01)
*H04L 61/103* (2022.01)

(52) U.S. Cl.
CPC .......... *H04L 63/102* (2013.01); *H04L 61/103* (2013.01); *H04L 61/2015* (2013.01)

(58) Field of Classification Search
CPC ............. H04L 63/1416; H04L 63/0428; H04L 63/0236; H04L 12/4641; H04L 47/17; H04L 63/10; H04L 63/1433; H04L 61/6068; H04L 63/102; H04L 61/1511; H04L 63/1458; H04L 61/103; H04L 61/2015; G06F 17/30864; G06F 9/45558
See application file for complete search history.

(56) References Cited

U.S. PATENT DOCUMENTS

| | | | | |
|---|---|---|---|---|
| 10,356,124 | B2* | 7/2019 | Thubert | H04L 61/1511 |
| 2002/0176404 | A1 | 11/2002 | Girard | H04V 13/42153 370/352 |
| 2007/0153813 | A1* | 7/2007 | Terpstra | H04L 65/80 370/401 |
| 2011/0161505 | A1* | 6/2011 | Siegel | H04M 7/0087 709/228 |
| 2011/0209177 | A1 | 8/2011 | Sela | H04N 7/17318 725/39 |
| 2012/0216239 | A1 | 8/2012 | Yadav | H04L 63/0227 726/1 |
| 2012/0331406 | A1* | 12/2012 | Baird | G06F 16/95 715/760 |
| 2014/0032773 | A1 | 1/2014 | Peter | H04L 67/142 709/228 |
| 2015/0200827 | A1* | 7/2015 | Agarwal | H04L 45/28 714/37 |
| 2016/0036762 | A1 | 2/2016 | Droms et al. | |
| 2016/0080395 | A1* | 3/2016 | Reddy | H04L 63/0236 726/23 |
| 2016/0087933 | A1 | 3/2016 | Johnson et al. | |
| 2016/0205078 | A1 | 7/2016 | James et al. | |
| 2016/0212099 | A1 | 7/2016 | Zou et al. | |
| 2016/0337181 | A1 | 11/2016 | Cathrow et al. | |
| 2016/0359673 | A1* | 12/2016 | Gupta | G06F 3/0482 |
| 2017/0149937 | A1 | 5/2017 | Ren | H04W 4/18 |
| 2017/0257311 | A1* | 9/2017 | Sharma | H04L 45/48 |
| 2017/0346855 | A1 | 11/2017 | Reddy | H04L 63/20 |
| 2018/0159894 | A1 | 6/2018 | Reddy | H04L 63/1458 |
| 2018/0167404 | A1 | 6/2018 | Machlica | H04L 63/1425 |

OTHER PUBLICATIONS

"MMD-0056-2016—Linux/Mirai, how an old ELF malcode is recycled", http://blog.malwaremustdie.org/2016/08/mmd-0056-2016-linuxmirai-justhtml, 24 pages, Aug. 31, 2016, malwaremustdie.org.
Greene, Tim., "Largest DDoS attack ever delivered by botnet of hijacked IoT devices", http://www.networkworld.com/article/3123672/security/largest-ddos-attack-ever-delivered-by-botnet-of-hijacked-iot-devices.html?token=%23tk.NWWNLE_nit_networkworld_after_dark_alert_2016-09-23&idg_eid=8d5e5067a210e22195282dc18824c23e&utm_source=Sailthru&utm_medium=email&utm_campaign=NWW%20After%20Dark%20Alert%202016-09-23&utm_term=networkworld_after_dark_alert#tk.NWW_nlt_networkworld_after_dark_alert_2016-09-23, 3 pages, Sep. 23, 2016, Network World.
Lear, E., "Manufacturer Usage Description Framework", Internet-Draft, <draft-lear-mud-framework-00>, Jan. 21, 2016, 11 pages, Internet Engineering Task Force Trust.
Paganini, Pierluigi., "A flaw in the D-LINK WI-FI camera affects more than 120 products", http://securityaffairs.co/wordpress/49143/hacking/d-link.html, 1 page, Jul. 8, 2016, Security Affairs.
Paganini, Pierluigi., "DVRs exposed on Internet with Hardcoded Passwords", http://securityaffairs.co/wordpress/44599/hacking/dvrs-exposed-hardcodedpasswords.html, 1 page, Feb. 19, 2016, Security Affairs.
Paganini, Pierluigi., "Linus/Mirai ELF, when malware is recycled could be still dangerous", http://securityaffairs.co/wordpress/50929/malware/linus-mirai-elf.html, 5 pages, Sep. 5, 2016, Security Affairs.
Storm, Darlene., "New botnet launching daily massive DDoS attacks", http://www.computerworld.com/article/3147081/security/new-botnet-launching-daily-massive-ddos-attacks.html, 3 pages, Dec. 5, 2016, Computer World, IDG Communications.
https://www.virustotal.com/en/file/5bf5d7d6914b14c6b98ca747d3ce463e4289d6614beba72deccd59cd08c90ed3/analysis/; pp. 1-2.
Patrick Donegan "Building Security Into CSP Cloud Transformation Strategies" White Paper; www.heavyreading.com; Jun. 2016; pp. 1-10.
Patrick Donegan "Mobile Security: Responsibilities & Opportunities for Operators" White Paper; www.heavyreading.com; Dec. 2015; pp. 1-16.

* cited by examiner

DYNAMIC DEVICE ISOLATION IN A NETWORK

The present application is a continuation of U.S. patent application Ser. No. 15/446,707, filed Mar. 1, 2017, entitled DYNAMIC DEVICE ISOLATION IN A NETWORK, by Pascal Thubert, et al., the contents of which are incorporated by reference herein.

TECHNICAL FIELD

The present disclosure relates generally to computer networks, and, more particularly, to the dynamic isolation of a device in a network.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource. In recent times, even non-traditional computing devices have been infected with malware and used as part of a botnet. For example, one of the largest DDoS attacks in history was launched in October of 2016 by a botnet that comprised a large number of non-traditional, network-enabled devices, such as baby monitors, cameras, digital video records (DVRs), and the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
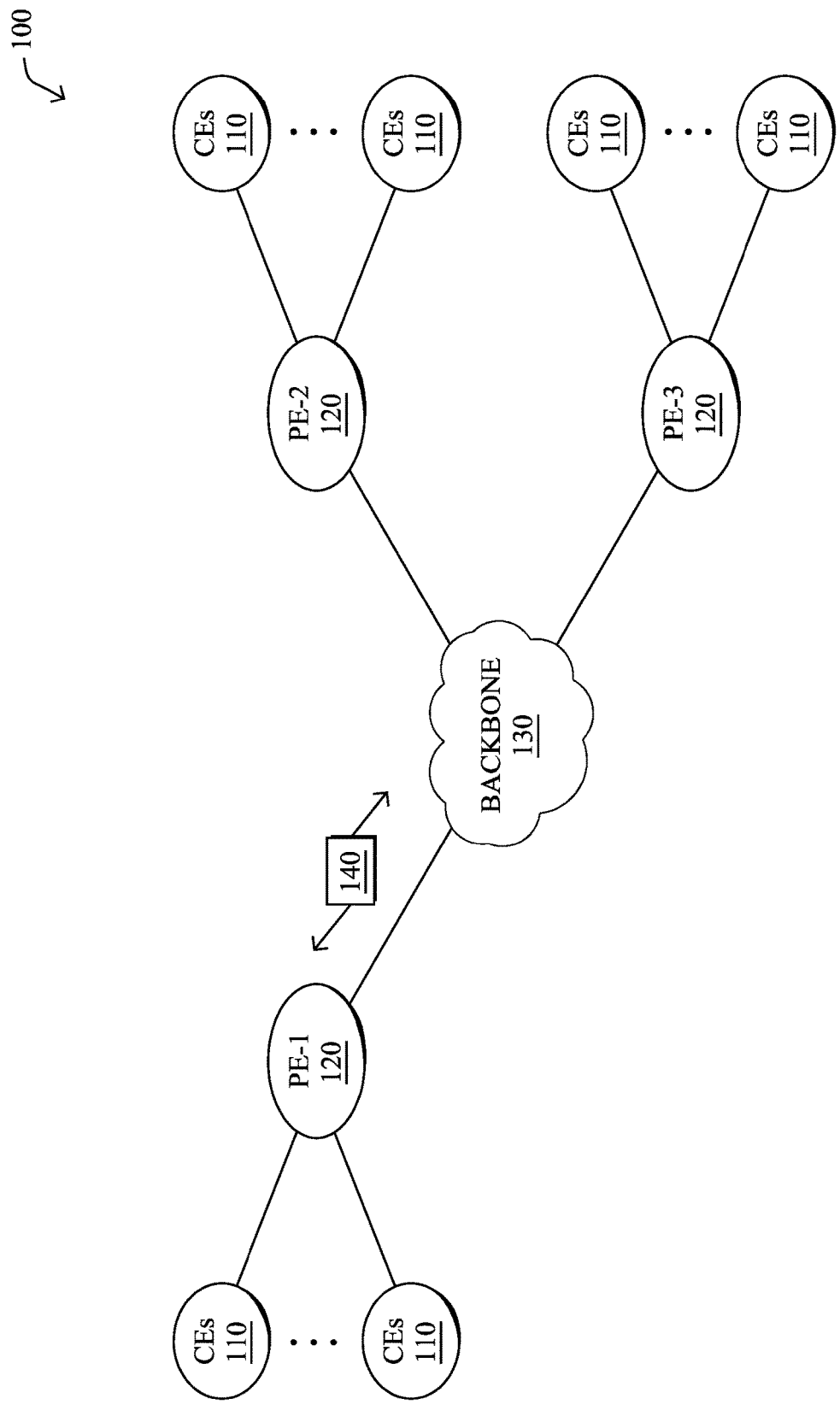
FIGS. 1A-1B illustrate an example communication network.

According to one or more embodiments of the disclosure, a device in a network inserts a profile tag into an address request sent by an endpoint node in the network to a lookup service. The lookup service is configured to identify one or more addresses with which the endpoint node is authorized to communicate based on a profile for the endpoint node associated with the inserted profile tag. The device receives an address response sent from the lookup service to the endpoint node that indicates the set of one or more addresses with which the endpoint node is authorized to communicate. The device determines whether a communication between the endpoint node and a particular network address is authorized using the set of one or more addresses with which the endpoint node is authorized to communicate. The device blocks the communication based on a determination that the particular network address is not in the set of one or more addresses with which the endpoint node is authorized to communicate.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications)

temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
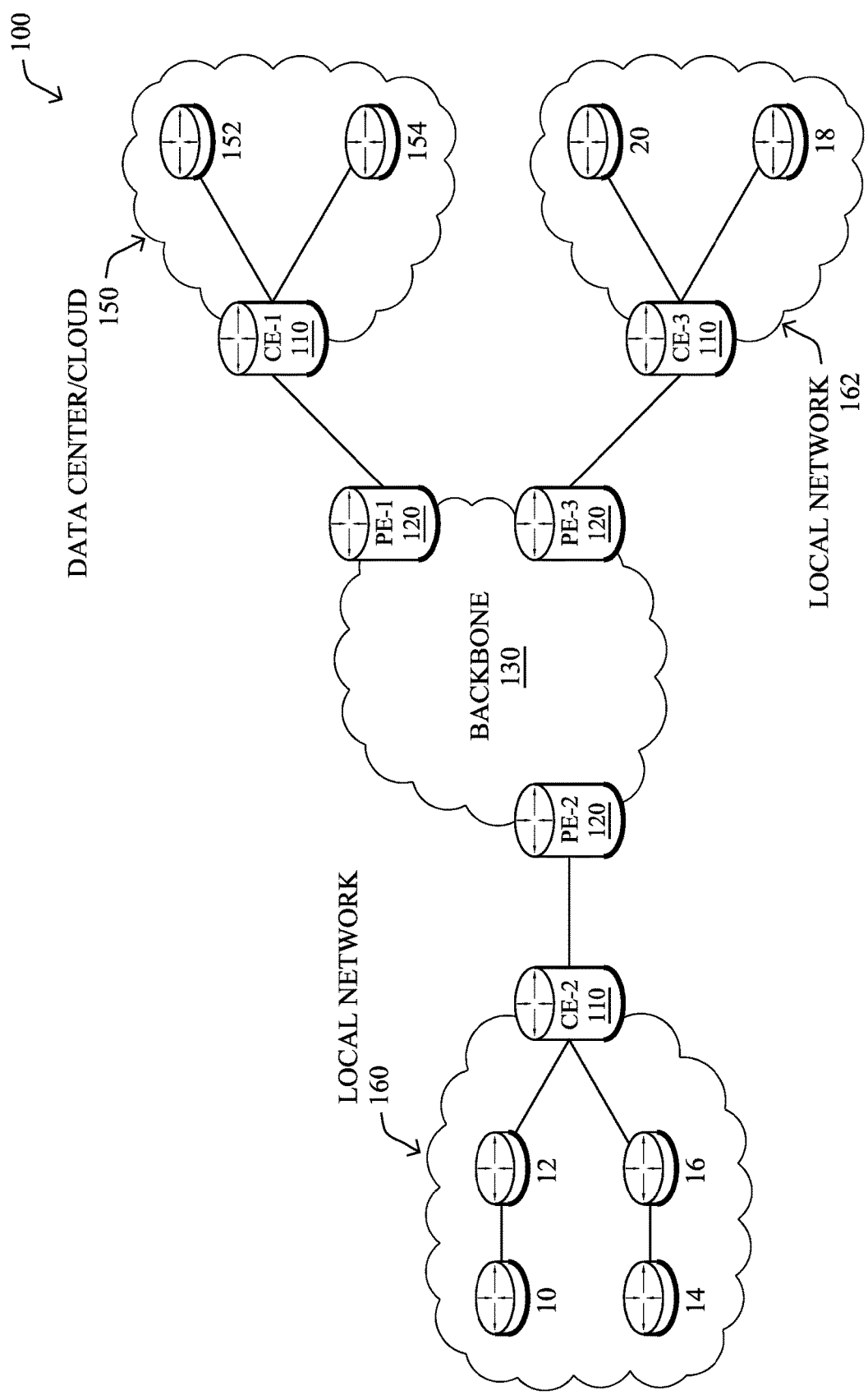

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), a Domain Name System (DNS) server, a policy server, an application server, etc. As would be appreciated, network 100 may include any number of local networks, data centers, cloud environments, devices/nodes, servers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
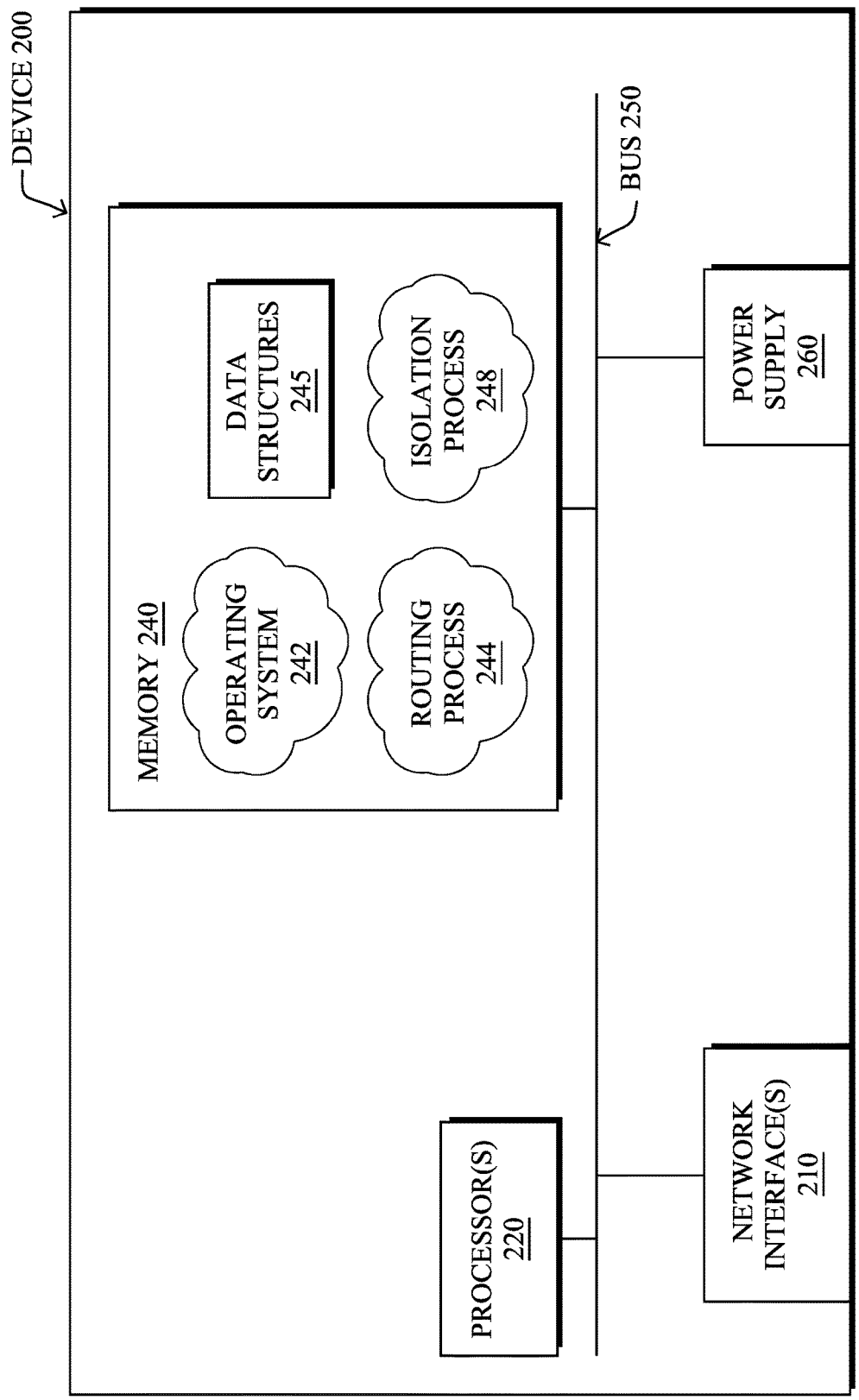
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a device isolation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

Another example routing protocol that is typically used in LLN implementations is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As noted above, many non-traditional devices are now joining computer networks as part of the IoT. For example, a Blu-Ray player may be connected to the Internet, so that the firmware of the player can be updated periodically. By virtue of being connected to a network, an IoT device is thus exposed to a number of new threats, such as being infected with malware by an outside source. However, in contrast to more traditional computing devices, many IoT devices also lack any local security mechanism, such as anti-malware/anti-virus software. Further, even if an IoT device currently only communicates with benign addresses today (e.g., the IP address of the vendor or manufacturer of the device), this does not guarantee that the addresses will remain benign throughout the lifespan of the device (e.g., if the vendor or manufacturer is acquired and the site IP address changes, etc.).

Dynamic Device Isolation in a Network

The techniques herein provide a network-based mechanism to protect endpoint nodes/devices from contact with potentially malicious entities in the network. In some aspects, an address lookup service (e.g., a service directory, DNS service, etc.) may assess a policy associated with an endpoint node that is requesting an address lookup, to return the address(es) with which the node is authorized to communicate (or none, if not authorized). In further aspects, a networking device (e.g., an access point, switch, router, etc.) between the endpoint node and the lookup service may parse the authorized address(es) in the response and, in turn, enforce isolation rules for the endpoint node based on the authorized address(es).

Specifically, according to one or more embodiments of the disclosure as described in detail below, a device in a network inserts a profile tag into an address request sent by an endpoint node in the network to a lookup service. The lookup service is configured to identify one or more addresses with which the endpoint node is authorized to communicate based on a profile for the endpoint node associated with the inserted profile tag. The device receives an address response sent from the lookup service to the endpoint node that indicates the set of one or more addresses with which the endpoint node is authorized to communicate. The device determines whether a communication between the endpoint node and a particular network address is authorized using the set of one or more addresses with which the endpoint node is authorized to communicate. The device blocks the communication based on a determination that the particular network address is not in the set of one or more addresses with which the endpoint node is authorized to communicate.

Illustratively, the techniques described herein may be performed by hardware, software, and/or firmware, such as in accordance with the isolation process 248, which may include computer executable instructions executed by the processor 220 (or independent processor of interfaces 210) to perform functions relating to the techniques described herein, e.g., in conjunction with routing process 244.

Figure 3A:
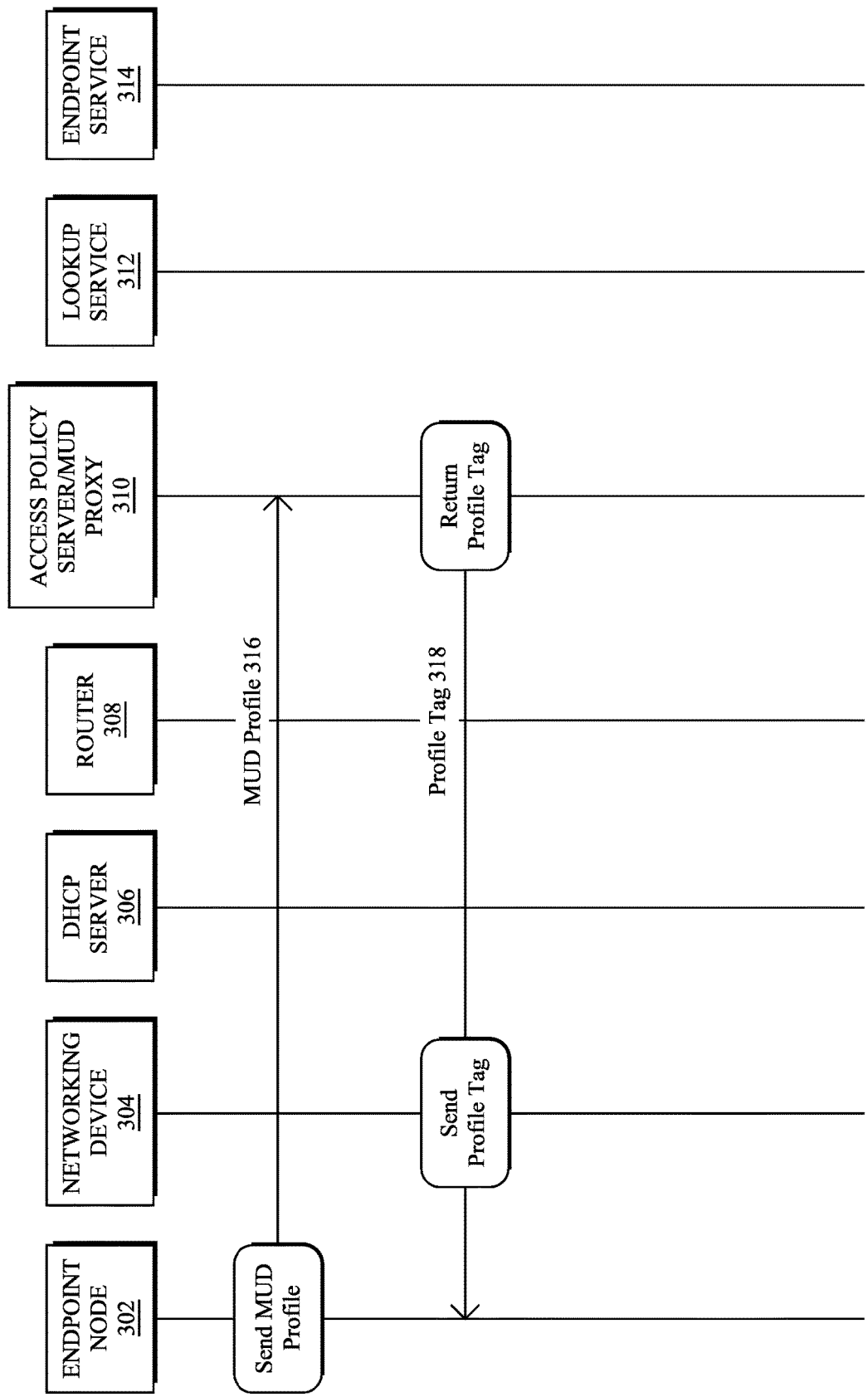
FIGS. 3A-3B illustrate examples of a networking device obtaining a profile tag for an endpoint node.
Figure 3B:
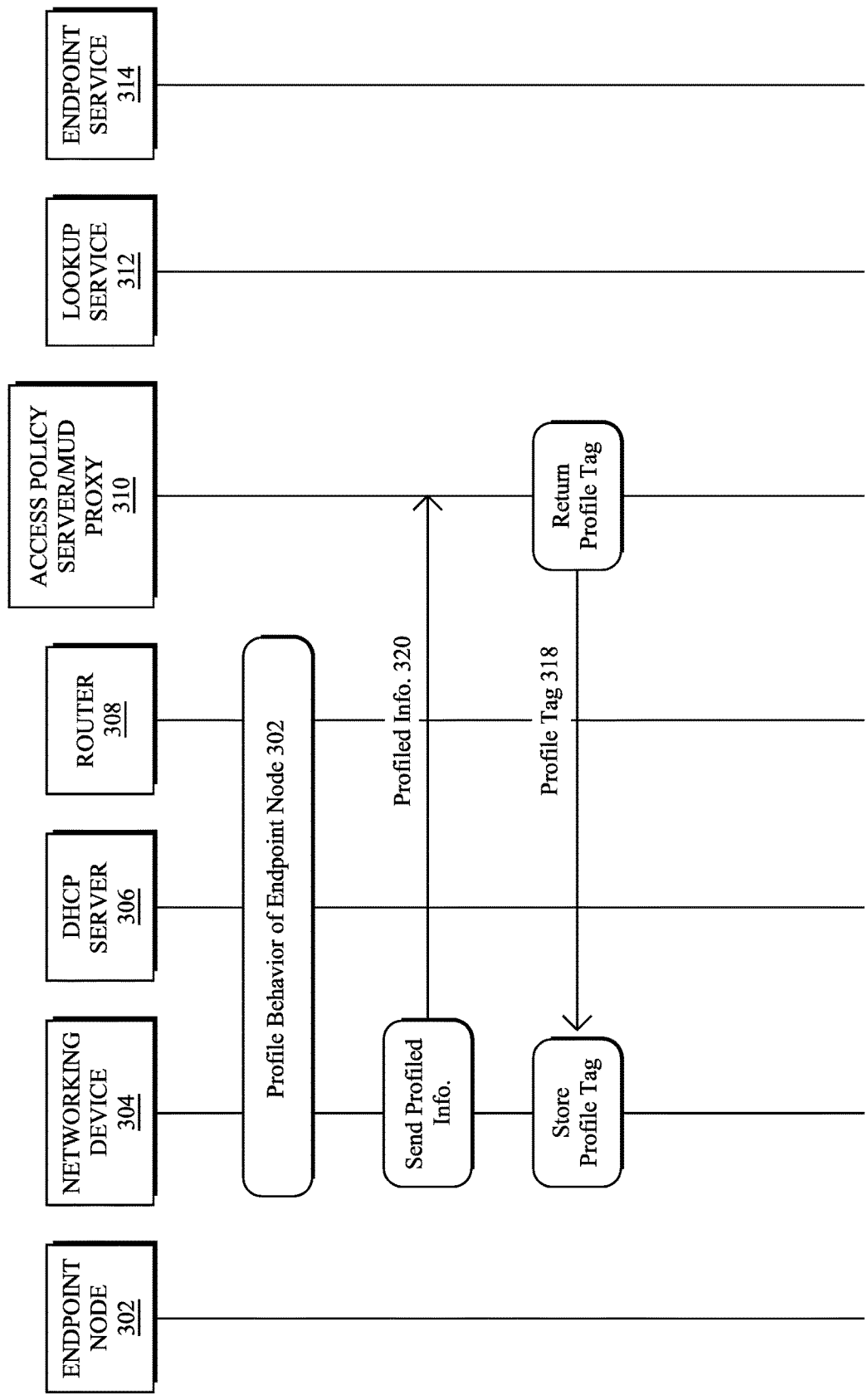

Operationally, FIGS. 3A-3B illustrate examples of a networking device obtaining a profile tag for an endpoint node, according to various embodiments. As shown, assume that the network comprises an endpoint node 302 (e.g., an IoT device, etc.), a networking device 304, a DHCP server 306, a router 308, an access policy server 310, a lookup service/server 312, and an endpoint service/server 314. For example, endpoint node 302, networking device 304, and DHCP server 306 may be part of a local network connected to a WAN via router 308, to which access policy server 310, lookup service 312, endpoint service 314, etc., may be connected.

Endpoint node 302 may be any form of network-capable node/device. For example, endpoint node 302 may be an IoT device such as a sensor, actuator, camera, consumer electronic device, portable or wearable electronic device, or the like.

In various embodiments, networking device 304 may be a first hop, last hop, or intermediary networking device that processes communication traffic associated with endpoint node 302 in the network. For example, networking device 304 may be an access point (AP) to which endpoint node 302 is attached, a router or switch between endpoint node 302 and the other various services with which endpoint node 302 may communicate (e.g., lookup service 312, endpoint service 314, etc.). In general, networking device 304 may snoop protocol communications and intercept data packets of communications associated with endpoint node 302, which may include both communications sourced by endpoint node 302, as well as communications destined to endpoint node 302. For example, networking device 304 may be a first hop switch that faces endpoint node 302, and potentially a mesh of IoT devices, to provide First Hop Security (FHS) to the endpoints. Alternatively, in other embodiments, networking device 304 may be an access control list (ACL) handler, lightweight firewall, or other dedicated security mechanism.

Other networking devices may also be present in the network, in addition to networking device 304. For example, the local network of endpoint node 302 may include a DHCP server 306 that assigns IP addresses to endpoint node 302, etc. Similarly, the local network of endpoint node 302 may include at least one router 308 that may operate on the edge of the local network.

In various embodiments, access server 310 may be any form of policy server configured to maintain an access policy for endpoint node 302. For example, access policy server 310 may be a RADIUS-based server, Diameter-based server, Authentication, Authorization, and Accounting (AAA) server, or the like. In some embodiments, server 310 may be configured to maintain node/device profile information, such as profile information regarding endpoint node 302 from the manufacturer or vendor of endpoint node 302. For example, server 310 may operate as a Manufacturer Usage Description (MUD) proxy, in one embodiment. In general, MUD represents one framework in which the manufacturer of a node/device can specify the capabilities or behaviors of a particular type of node/device as part of a MUD profile, as detailed in the IETF draft entitled "Manufacturer Usage Description Framework"<draft-lear-mud-framework-00> by E. Lear.

Access server 310 may also maintain various data stores (e.g., databases) to implement the techniques herein. For example, one data store of access server 310 may include information regarding the profiles of various node/device types (e.g., profile A for device type X from manufacturer Y, etc.). Another data store of access server 310 may map or otherwise assign profile tags to node/device identifiers, thereby allowing a lookup of the corresponding profile for a given endpoint node.

Lookup service 312 may be of any form of service that provides address lookup information to client nodes on request. For example, in some embodiments, lookup service 312 may be a directory of available services in the network, such as endpoint service 314. In further embodiments, lookup service 312 may be a DNS service.

Endpoint service 314 may be any form of online service such as, but not limited to, a software download or update service, a data collection service, a supervisory service, an application service, or the like. For example, in some cases, endpoint service 314 may be associated with the manufacturer or vendor of endpoint node 302 (e.g., to monitor a sensor reading from endpoint node 302, to update the firmware of endpoint node 302, etc.).

As would be appreciated, the implementation shown is exemplary only and the depicted devices and services can be combined or excluded as desired. For example, router 308 may also act as DHCP server 306, networking device 304 may be router 308, lookup service 312 may be executed by the same server as access policy server 310, etc. Additional devices and/or services may be present, as well, in further implementations.

Two possibilities exist with respect to identifying the profile of endpoint node 302. In the first case, endpoint node 302 may be configured to use the MUD protocol, or a similar protocol, to signal its vendor or manufacturer supplied profile. In the second case, however, endpoint node 302 may not have this functionality, such as in the case of many legacy IoT devices.

FIG. 3A illustrates an example of the case in which endpoint node 302 uses the MUD protocol or a similar protocol, according to various embodiments. As shown, endpoint node 302 may store and expose its own profile, such as a MUD profile 316 and potentially verified through a secure verification mechanism (e.g., an X.509 certificate signed by a trusted third party, etc.). In doing so, this allows access server 310 to store the corresponding profile of endpoint node 302 and return an assigned profile tag 318 to endpoint node 302, to facilitate future lookups of profile 316.

In various embodiments, networking device 304 may monitor the exchange between endpoint node 302 and access server 310, to obtain and store profile tag 318. In other embodiments, access server 310 may instead send profile tag 318 to networking device 304 directly for storage and future use. Consequently, networking device 304 now has profile tag 318 that can be used to retrieve the profile 316 of endpoint node 302, as needed.

As shown in FIG. 3B, assume that endpoint node 302 is not configured to expose its node/device profile. In such a case, the devices in the local network to which endpoint node 302 is attached may profile endpoint node 302 by monitoring its traffic patterns, characteristics, behaviors, and the like, to obtain profiled information about endpoint node 302. For example, networking device 304, and potentially in conjunction with DHCP server 306 and/or router 308, may profile endpoint node 302 and send the resulting profiled information 320 to access server 310. Note that while endpoint node 302 is being profiled, additional security may be applied to endpoint node 302 in the network, such as by quarantining endpoint node 302, restricting access of endpoint node 302 to certain services or destinations, etc. Further, in some embodiments, the profiling of endpoint node 302 may be performed in a sandbox or other test environment, in some cases.

Similar to the example in FIG. 3A, access server 310 in FIG. 3B may store the profiled information 320 regarding endpoint node 302 as the profile for the node, associate a profile tag 318 with the profile, and return profile tag 318 to networking device 304. In turn, networking device 304 may store profile tag 318 for further use, to allow retrieval of the profile of endpoint node 302 from access server 310.

As noted above, the profile for endpoint node 302 may be indicative of the capabilities and behaviors of the type of node/device of endpoint node 302. For example, the profile of endpoint node 302 may indicate the one or more online services with which endpoint node 302 is expected to communicate (e.g., to report a sensor reading to a monitoring service, to download firmware from an update service of the manufacturer, etc.).

Figure 4:
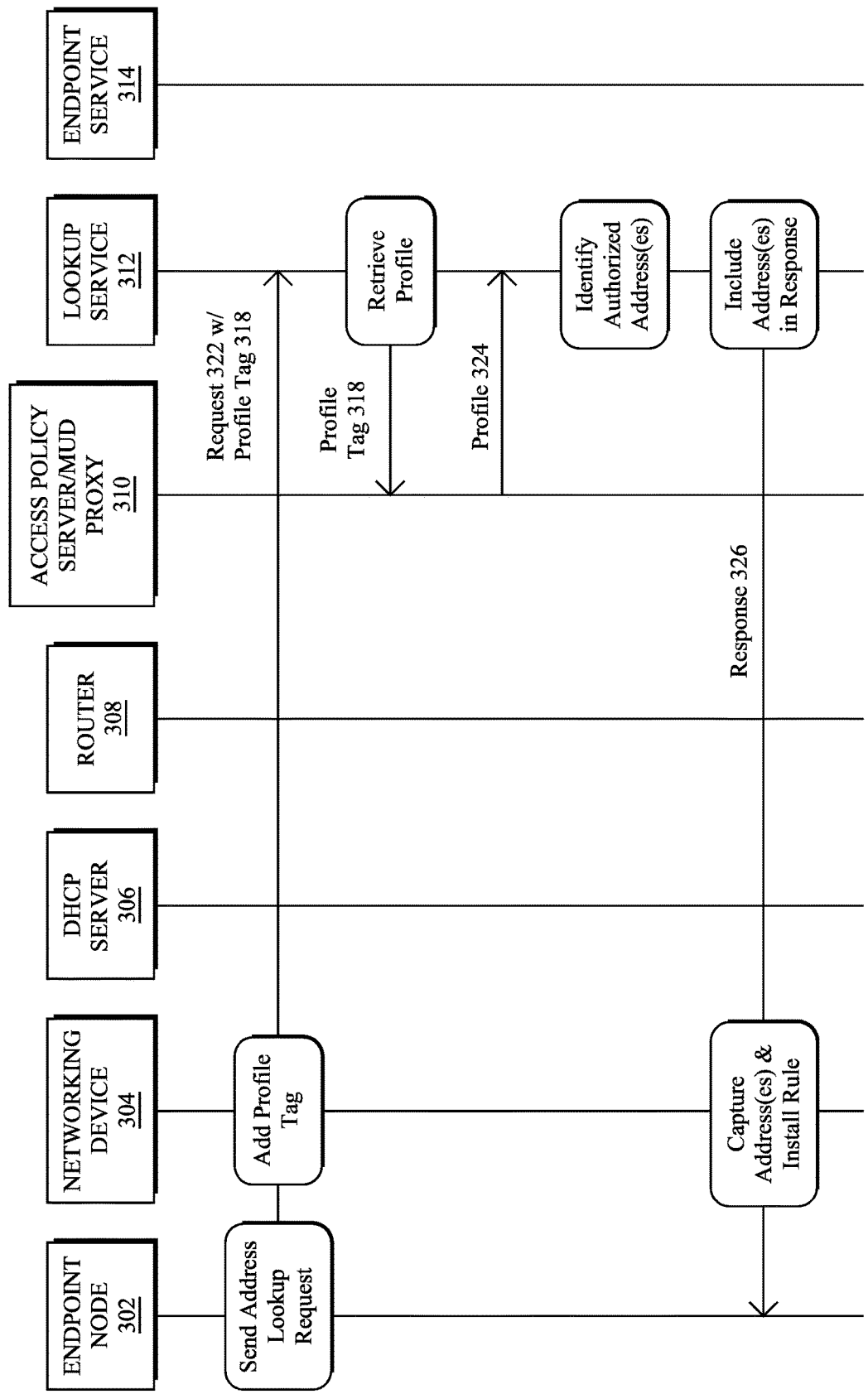
FIG. 4 illustrates an example of a lookup service notifying a networking device of one or more authorized addresses with which an endpoint node can communicate.

FIG. 4 illustrates an example of a lookup service notifying a networking device of one or more authorized addresses with which an endpoint node can communicate, according to various embodiments. Assume, for purposes of example, that networking device 304 has obtained the profile tag 318 for endpoint node 302 using either of the mechanisms illustrated and described with respect to FIGS. 3A-3B. In such a case, networking device 304 may maintain a local table as follows:

TABLE 1

| MAC | SRC-IP | TAG | DST-IP |
|---|---|---|---|
| $MAC_{302}$ | $IP_{302}$ | $TAG_{302}$ | — |

In other words, networking device 304 may associate the MAC and IP addresses of endpoint node 302 with the profile tag for endpoint node 302 (e.g., profile tag 318 returned from access server 310).

To access a given online service, endpoint node 302 may first perform an address lookup of the service. Accordingly, endpoint node 302 may send an address request 322 to lookup service 312 for the IP address of the desired service. For example, address request 322 may be a DNS lookup request for an online service, such as a vendor site, cloud-based pub/sub service, or the like.

In various embodiments, networking device 304 may receive/intercept request 322 and add profile tag 318 to request 322 before sending request 322 on to lookup service 312. As a result, lookup service 312 has not only information regarding the requested service, but also the profile tag 318 that can be used to retrieve the profile for endpoint node 302 from access service 310. Notably, in some cases, address request 322 may include the name of the requested service (e.g., "pub-sub.well-known," etc.), to request that lookup service 312 select the server/address for the service and potentially also based on other information in request 322 such as the address of endpoint node 302, other metadata in request 322, etc.

Before simply returning the address of the requested service to endpoint node 302, lookup service 312 may first ensure that endpoint node 302 is authorized to access that service or address by policy. In various embodiments, lookup service 312 may do so by retrieving the profile for endpoint node 302 from access server 310 using the profile tag 318 included in address request 322 by networking device 304. In turn, access server 310 may send the profile 324 for endpoint node 302 to lookup service 312 for analysis. In other embodiments, access server 310 may instead perform the analysis locally using an indication of the service and profile tag 318 sent by lookup service 312 to access server 310.

In the simplest case, lookup service 312 may determine whether the requested service from request 322 matches any of the one or more services in profile 324. If no match is found, lookup service 312 may determine that endpoint node 302 is not authorized access the address of the requested service and either send no response to endpoint node 302 or, alternatively, an indication of the determination to endpoint node 302 and/or networking device 304. Conversely, if the service requested by request 322 matches an authorized service in profile 324, lookup service 326 may include the one or more addresses associated with the service in an address response 326 sent back to endpoint node 302. For example, response 326 may include not only the address of the service requested by request 322, but also any other associated addresses to which endpoint node 302 may also contact (e.g., to obtain webservice which are not located at the main DNS address that is looked up by lookup service 312), which may be indicated in the metadata of request 322.

In various embodiments, lookup service 312 may also be operable to map legacy services in profile 324 to replacement services that may be available in the network. For example, if a vendor site has changed from that included in request 322, lookup service 312 may identify the new site and return the address of the new site to endpoint node 302 via response 326. In another example, if the service requested in request 322 has been obsoleted and replaced by a new service that is backwards compatible, lookup service 312 may identify the replacement service and return the address of the replacement service to endpoint node 302 via response 326.

By monitoring the communications associated with endpoint node 302, networking device 304 may obtain the address(es) with which endpoint node 302 is authorized to communicate from address response 326. In turn, networking device 302 may install one or more local rules, to enforce this authorization. For example, assume that lookup service 312 determines that endpoint node 302 is authorized to communicate with endpoint service 314 and includes the address of endpoint service 314 in address response 326. In turn, networking device 304 may capture this address information and update its local table as follows:

TABLE 2

| MAC | SRC-IP | TAG | DST-IP |
|---|---|---|---|
| $MAC_{302}$ | $IP_{302}$ | $TAG_{302}$ | $IP_{314}$ |

This allows networking device 304 to locally make decisions as to whether or not a given communication associated with endpoint node 302 is authorized and take appropriate measures, accordingly. Networking device 304 may also preform the lookup again to refresh its state, such as periodically or on error or reboot.

Figure 5A:
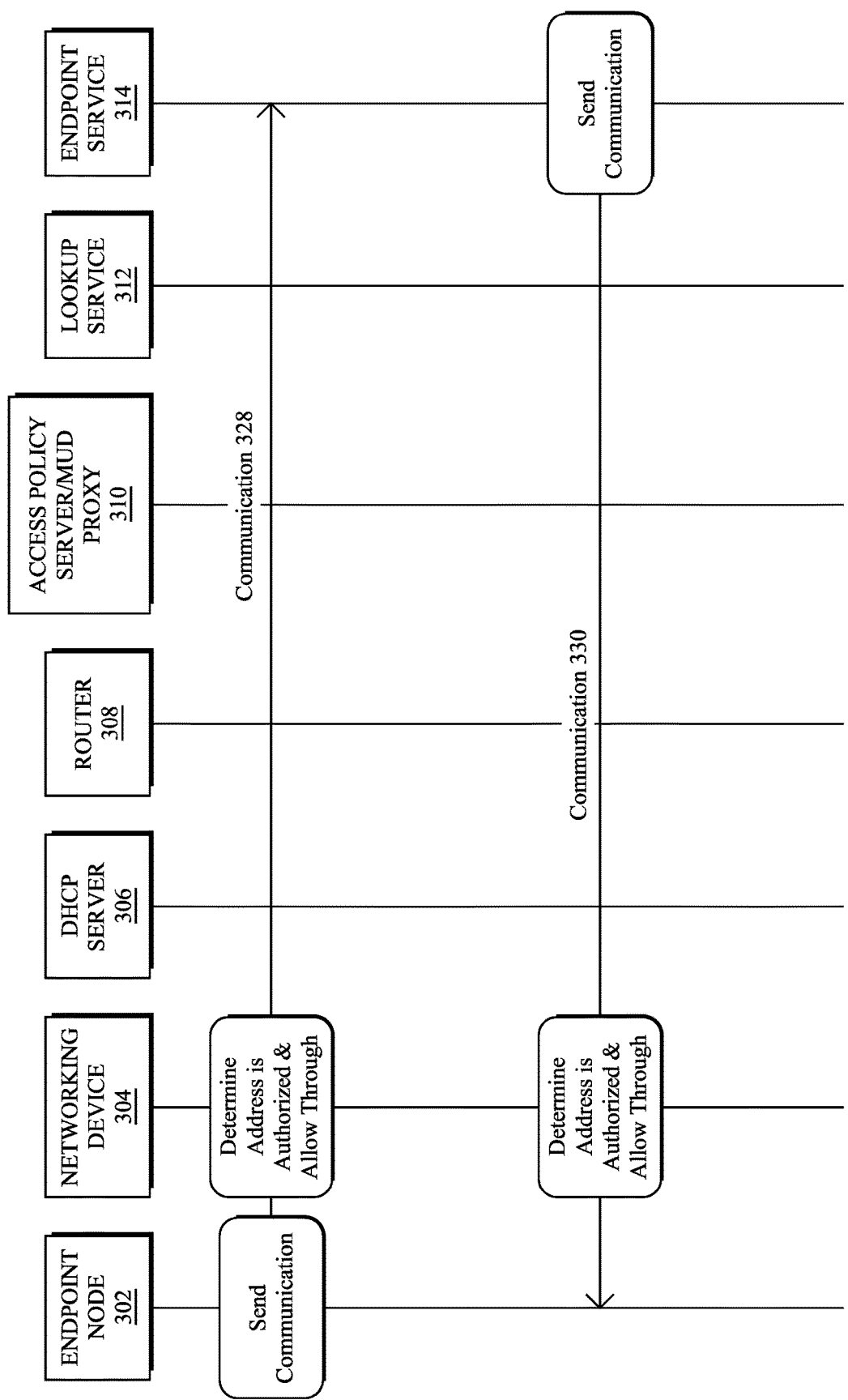
FIGS. 5A-5B illustrate examples of a networking device analyzing communications associated with an endpoint node.
Figure 5B:
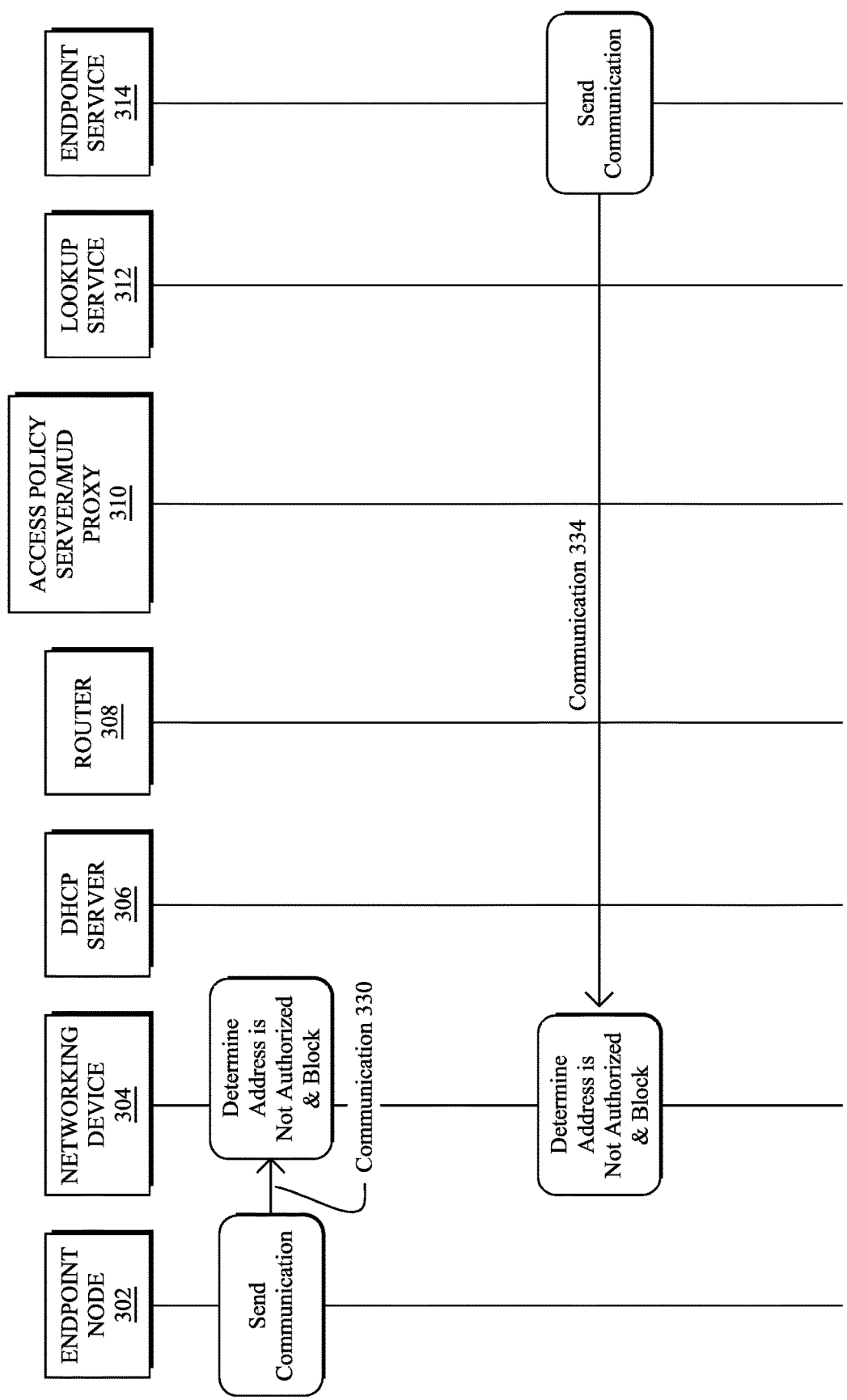

FIGS. 5A-5B illustrate examples of networking device 304 analyzing communications associated with endpoint node 302, according to various embodiments. Continuing the above examples, assume that endpoint node 302 has been authorized to communicate with the address of endpoint service 314 and that networking device 304 has stored a local rule based on the intercepted address information. When endpoint node 302 subsequently sends a communication 328 to the address of endpoint service 314, networking device 304 may determine that the address of endpoint service 314 is authorized and allow communication 328 to be sent on to endpoint service 314. Similarly, if endpoint service 314 sends a communication 330 to endpoint service 314, networking device 304 may determine whether the address of endpoint service 314 is authorized and, if so, forward communication 330 on to endpoint node 302. Note that in some cases, only unidirectional communications may be authorized, such as by only allowing endpoint node 302 to send traffic to endpoint service 314, but not vice-versa.

In FIG. 5B, assume that there is another endpoint service 332 that has an address outside of the set of authorized one or more addresses maintained by networking device 304 for endpoint node 302. In such a case, networking device 304 may monitor an outgoing communication 330 sent by endpoint node 302 and determine that the destination address (e.g., the IP address of endpoint service 332) is not in the authorized list for endpoint node 302. In turn, networking device 304 may perform any number of mitigation actions, based on the determination that the destination address is not in the authorized list of addresses for endpoint node 302. For example, networking device 304 may drop the packets of communication 330 as shown, generate a notification about the unauthorized attempt, or take other mitigation actions. Similar to outgoing communication 330, networking device 304 may also block an incoming communication 334 from endpoint service 332 if the address of endpoint service 332 is not an authorized address for endpoint node 302.

Figure 6:
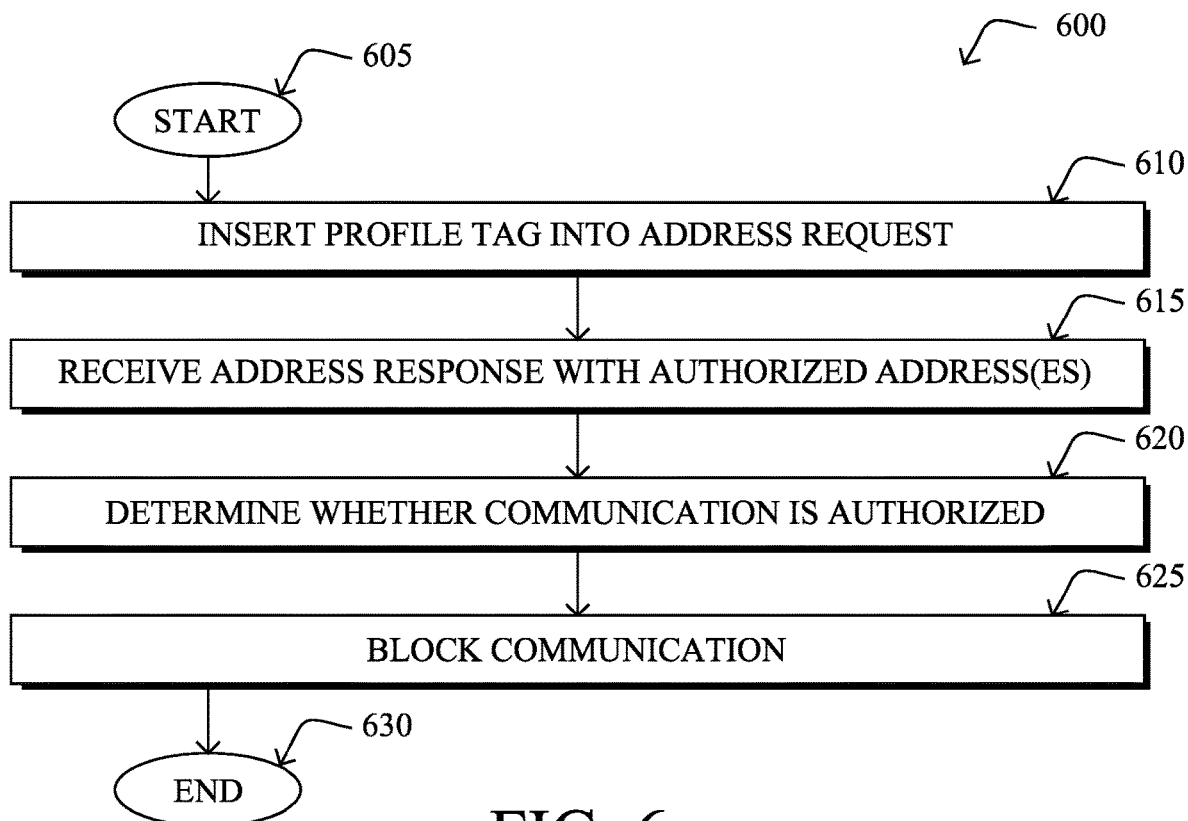
FIG. 6 illustrates an example simplified procedure for isolating an endpoint node in a network.

FIG. 6 illustrates an example simplified procedure for isolating an endpoint node in a network, in accordance with one or more embodiments described herein. For example, a non-generic, specifically configured device (e.g., device 200) may perform procedure 600 by executing stored instructions (e.g., process 248). For example, a networking device (e.g., router, switch, access point, etc.) that processes communication traffic for an endpoint node in the network may perform procedure 600. The procedure 600 may start at step 605, and continues to step 610, where, as described in greater detail above, the device may insert a profile tag for the endpoint node into an address request sent by the endpoint node to a lookup service. For example, the address request may be a DNS request sent by the endpoint node to a DNS server, to request the address of a specified service. In various embodiments, the lookup service may configured to identify one or more addresses with which the endpoint node is authorized to communicate based on a profile for the endpoint node associated with the inserted profile tag.

At step 615, as detailed above, the device may receive an address response from the lookup service (e.g., based on the address request of step 610). For example, if the device is an intermediate networking device between the endpoint node and the lookup service, the device may intercept the response for further analysis before forwarding the response on to the endpoint node. In various embodiments, the address response may indicate one or more addresses to which the endpoint node is authorized to communicate. For example, the lookup service may be configured to only respond to address requests if the requesting node is authorized to communicate with the address based on a profile of the node.

At step 620, the device may determine whether a communication between the endpoint node and a particular network address is authorized, as described in greater detail above. Such a communication may either be outgoing from the endpoint node or incoming to the endpoint node. As noted, the device may be located along the path between the endpoint node and the other address, allowing the device to snoop or otherwise intercept the communications along the path. In various embodiments, the device may make the authorization determination using the set of one or more addresses with which the endpoint node is authorized to communicate. For example, if the communication is destined for an address that is not in the authorized list, or if the communication was sent by an address that is not in the authorized list, the device may determine that the communication is unauthorized.

At step 625, as detailed above, the device may block the communication based on the determination from step 620. For example, if the device is in the path between the endpoint node and the other address, the device may simply drop the packet(s) of the communication, thereby preventing the communication from reaching its destination. In this way, the device may dynamically isolate the endpoint node being protected from potentially malicious communications. Procedure 600 then ends at step 630.

Figure 7:
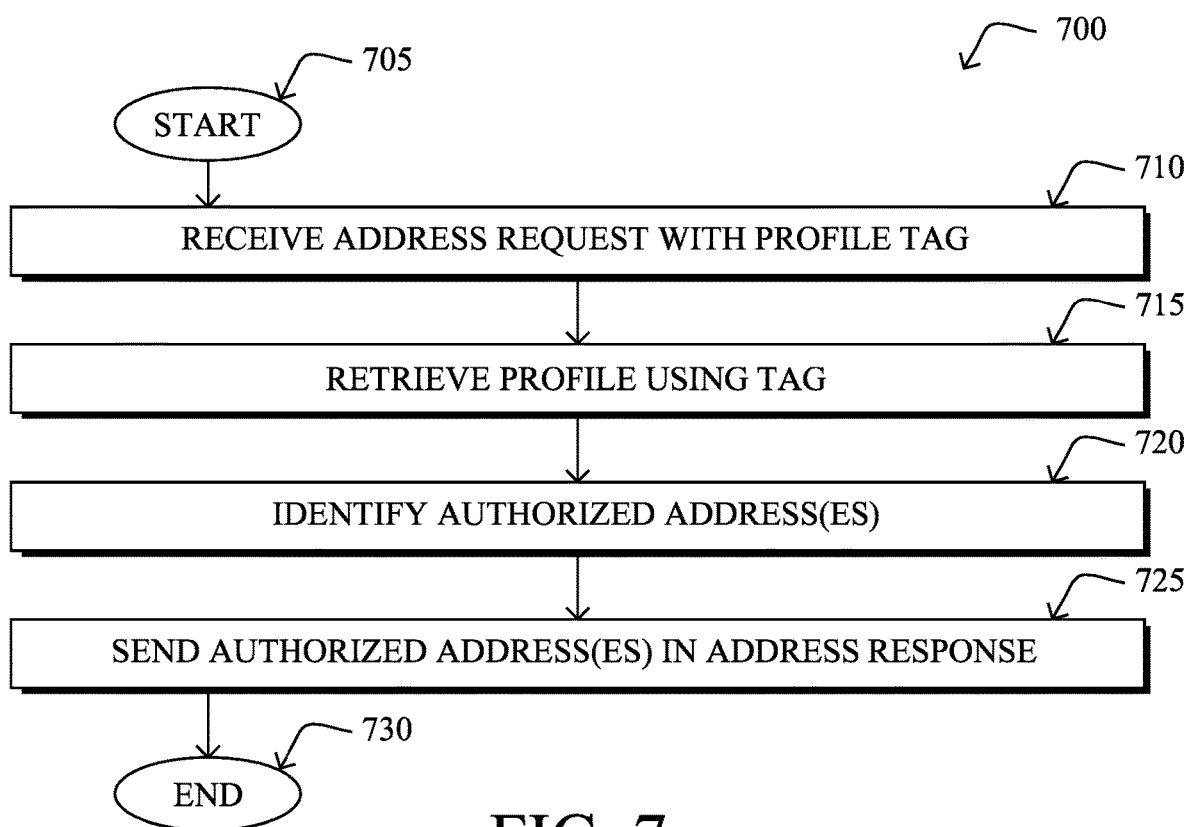
FIG. 7 illustrates an example simplified procedure for identifying an authorized address based on a profile for an endpoint node.

FIG. 7 illustrates an example simplified procedure for identifying an authorized address based on a profile for an endpoint node in accordance with the techniques herein. Generally, procedure 700 may be performed by a specialized device in a network, such as a device that provides an address lookup service to endpoint nodes in the network. For example, the lookup service device may be a DNS server, in some embodiments. Procedure 700 may start at step 705 and continues on to step 710 where, as described in greater detail above, the lookup service device may receive an address request from an endpoint node in the network (e.g., for a particular service with which the endpoint node wishes to communicate). In various embodiments, the address request may include a profile tag for the endpoint node that was inserted into the address request by a networking device in the network.

At step 715, as detailed above, the lookup service device may retrieve the profile of the endpoint node using the inserted profile tag. For example, the lookup service may request the profile of the endpoint node by sending the profile tag to an access server, MUD proxy, a local database of profiles, or the like, as part of a profile request. In various embodiments, the profile of the endpoint node may indicate the service(s) with which the endpoint node is expected to communicate, such as the website of the manufacturer or vendor of the endpoint node.

At step 720, the lookup service device may identify one or more addresses with which the endpoint node is authorized to communicate based on the profile for the endpoint node, as described in greater detail above. For example, the lookup service device may identify an IP address of the service indicated in the request of step 710 that matches, or is associated with, the profile from step 715. Notably, an authorized address may be the address of a service indicated by the profile itself, a replacement service for a service indicated in the profile, and/or other addresses associated with such a service with which the endpoint node is also expected to communicate.

At step 725, as detailed above, the lookup service device may send the one or more addresses with which the endpoint node is authorized to communicate to the networking device. For example, the lookup service device may include the authorized address(es) in an address lookup response to the endpoint node that is snooped/intercepted by the networking device. In turn, the networking device may block communications between the endpoint node and addresses that are not in the one or more addresses with which the endpoint node is authorized to communicate, or take other corrective measures. Procedure 700 then ends at step 730.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, allow for the centralized management of the control over which addresses and services an endpoint node is allowed to communicate. Further, no new protocols are required to implement the techniques herein in the endpoint (IoT) device and can be implemented leveraging already implemented servers/services such as DNS and service directories (e.g., a CoAP-based service, etc.).

While there have been shown and described illustrative embodiments that provide for dynamically device isolation in a network, it is to be understood that various other adaptations and modifications may be made within the spirit and scope of the embodiments herein. For example, while certain protocols are shown, such as DNS and MUD, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
profiling, by a device in a network, traffic associated with an endpoint node in the network;
requesting, by the device, a profile tag from an access policy server;
inserting, by the device, the profile tag into an address request sent by the endpoint node to a lookup service, wherein the lookup service is configured to identify one or more addresses with which the endpoint node is authorized to communicate based on a profile for the endpoint node associated with the inserted profile tag, wherein the profile is indicative of the services the endpoint node is expected to communicate with;
receiving, by the device, an address response sent from the lookup service to the endpoint node that indicates the one or more addresses with which the endpoint node is authorized to communicate, wherein the one or more addresses are associated with the services;
determining, by the device, whether a communication between the endpoint node and a particular network address is authorized using the one or more addresses with which the endpoint node is authorized to communicate; and
automatically blocking, by the device, the communication based on a determination that the particular network address is not in the one or more addresses with which the endpoint node is authorized to communicate by dropping packets of the communication.

2. The method as in claim 1, wherein the lookup service comprises a Domain Name System (DNS) lookup service, and wherein the address request comprises a DNS lookup request.

3. The method as in claim 1, wherein the access policy server comprises a Manufacturer Usage Description (MUD) proxy.

4. The method as in claim 1, further comprising:
intercepting, by the device, the profile tag from a communication between the endpoint node and a Manufacturer Usage Description (MUD) proxy.

5. The method as in claim 1, wherein the lookup service identifies the one or more addresses with which the endpoint node is authorized to communicate by:
retrieving a profile for the endpoint node associated with the inserted profile tag.

6. A method comprising:
receiving, at a lookup service device in a network, an address request from an endpoint node in the network, wherein the address request includes a profile tag for the endpoint node inserted into the address request by a networking device in the network, wherein the networking device profiles traffic associated with the endpoint node and requests the profile tag from an access policy server;
retrieving, by the lookup service device, a profile for the endpoint node associated with the inserted profile tag, wherein the profile is indicative of services the endpoint node is expected to communicate with;
identifying, by the lookup service device, one or more addresses with which the endpoint node is authorized to communicate based on the profile for the endpoint node, wherein the one or more addresses are associated with the services; and
sending, by the lookup service device, the one or more addresses with which the endpoint node is authorized to communicate to the networking device, wherein the networking device:
blocks communications between the endpoint node and addresses that are not in the one or more addresses with which the endpoint node is authorized to communicate by dropping packets of the communications, and
sends communications between the endpoint node and addresses that are in the one or more addresses with which the endpoint node is authorized to communicate.

7. The method as in claim 6, wherein the lookup service device comprises a Domain Name System (DNS) lookup service device, and wherein the address request comprises a DNS lookup request.

8. The method as in claim 6, wherein retrieving the profile for the endpoint node associated with the inserted profile tag comprises:
requesting, by the device, the profile from an access policy server using the profile tag.

9. The method as in claim 8, wherein the access policy server comprises a Manufacturer Usage Description (MUD) proxy.

10. The method as in claim 6, wherein the one or more addresses with which the endpoint node is authorized to communicate is associated with a manufacturer of the endpoint node.

11. An apparatus, comprising:
one or more network interfaces to communicate with a network;
a processor coupled to the network interfaces and configured to execute one or more processes; and
a memory configured to store a process executable by the processor, the process when executed operable to:
profile traffic associated with an endpoint node in the network;
request a profile tag from an access policy server;
insert the profile tag into an address request sent by the endpoint node to a lookup service, wherein the lookup service is configured to identify one or more addresses with which the endpoint node is authorized to communicate based on a profile for the endpoint node associated with the inserted profile tag, wherein the profile is indicative of the services the endpoint node is expected to communicate with;
receive an address response sent from the lookup service to the endpoint node that indicates the one or more addresses with which the endpoint node is authorized to communicate, wherein the one or more addresses are associated with the services;
determine whether a communication between the endpoint node and a particular network address is authorized using the one or more addresses with which the endpoint node is authorized to communicate; and
automatically block the communication based on a determination that the particular network address is not in the one or more addresses with which the endpoint node is authorized to communicate by dropping packets of the communication.

12. The apparatus as in claim 11, wherein the lookup service comprises a Domain Name System (DNS) lookup service, and wherein the address request comprises a DNS lookup request.

13. The apparatus as in claim 11, wherein the access policy server comprises a Manufacturer Usage Description (MUD) proxy.

14. The apparatus as in claim 11, wherein the process when executed is further operable to:
intercept the profile tag from a communication between the endpoint node and a Manufacturer Usage Description (MUD) proxy.

15. The apparatus as in claim 11, wherein the lookup service identifies the one or more addresses with which the endpoint node is authorized to communicate by:
retrieving a profile for the endpoint node associated with the inserted profile tag from an access policy server.

16. The apparatus as in claim 12, wherein the apparatus comprises at least one of: a network switch, a network router, or a network access point.

* * * * *